United States Patent
Akiyama et al.

(10) Patent No.: US 6,932,201 B2
(45) Date of Patent: Aug. 23, 2005

(54) SHOCK ABSORBING DEVICE

(75) Inventors: Hideki Akiyama, Saitama (JP); Norihiro Kurata, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/462,735

(22) Filed: Jun. 17, 2003

(65) Prior Publication Data

US 2004/0060791 A1 Apr. 1, 2004

(30) Foreign Application Priority Data

Jun. 28, 2002 (JP) ........................................ 2002-189794

(51) Int. Cl.[7] ................................................ F16F 7/12
(52) U.S. Cl. ........................ 188/377; 188/376; 188/371; 293/136; 267/139; 267/140
(58) Field of Search ................................ 188/377, 371, 188/372, 376; 293/132, 135, 136; 267/139, 140, 116, 122, 152, 257; 404/6, 7

(56) References Cited

U.S. PATENT DOCUMENTS

| | | | | |
|---|---|---|---|---|
| 3,721,433 A | * | 3/1973 | Sobel | 267/140 |
| 3,863,589 A | * | 2/1975 | Guienne et al. | 114/219 |
| 3,887,223 A | * | 6/1975 | Bez | 293/133 |
| 3,897,095 A | * | 7/1975 | Glance et al. | 293/120 |
| 4,321,989 A | | 3/1982 | Meinzer | |
| 4,974,820 A | * | 12/1990 | Nakanishi | 267/152 |
| 5,199,755 A | * | 4/1993 | Gertz | 293/120 |
| 6,142,253 A | | 11/2000 | Mueller et al. | |
| 6,595,502 B2 | * | 7/2003 | Koch et al. | 267/139 |

FOREIGN PATENT DOCUMENTS

| | | |
|---|---|---|
| DE | 1 137 607 | 10/1962 |
| DE | 23 40 527 A1 | 2/1975 |
| DE | 198 14 842 A1 | 10/1999 |
| DE | 198 20 449 A1 | 11/1999 |
| DE | 100 53 840 A1 | 5/2002 |
| JP | 10-141408 | 5/1998 |
| JP | 10-67374 A | 10/1998 |

* cited by examiner

Primary Examiner—Matthew C. Graham
Assistant Examiner—Mariano Sy
(74) Attorney, Agent, or Firm—Birch, Stewart, Kolasch & Birch, LLP

(57) ABSTRACT

To prevent a shock absorbing material mounted on a vehicle body from collapsing or being scattered under the shock at the time of a collision. The four sides of a shock absorbing material formed of a foamed material are surrounded by a bellows form cover consisting of four corrugated plates inclusive of corrugated plates. Under an external force due to collision, the bellows is folded and contracted easily, but is difficult to be deformed in the width directions. Therefore, the shock absorbing material receives the energy upon collision in its initial shape, so that the energy is absorbed substantially by the compression of the shock absorbing material. Accordingly, it suffices to design a set load for the shock absorbing material by taking into account only the shock absorbing material, so that it is easy to design the shape, material and the like of the shock absorbing material.

14 Claims, 2 Drawing Sheets

BEFORE DEFORMATION

AFTER DEFORMATION

BEFORE DEFORMATION

AFTER DEFORMATION

SHOCK ABSORBING DEVICE

BACKGROUND OF THE INVENTION

CROSS-REFERENCE TO RELATED APPLICATIONS

The present nonprovisional application claims priority under 35 USC 119 to Japanese Patent Application No.2002-189794 filed on Jun. 28, 2002 the entire contents thereof is hereby incorporated by reference.

1. Field of the Invention

The present invention relates to a shock absorbing device, and particularly to a shock absorbing device which is mounted on a vehicle such as a motorcycle and which can protect the rider(s) and equipment and materials at the time of collision.

2. Description of Background Art

In order to alleviate a shock exerted on the rider(s) upon collision of a vehicle or to mitigate the damage to the vehicle main body upon the collision, a shock absorbing device is provided. For example, Japanese Patent No. 3207789 discloses a deformation element as a shock absorbing device which is supported on a vehicle body frame of a motorcycle which projects to the front side of the vehicle. The shock absorbing device, in many cases, is a three-dimensional frame for guarding the front and rear sides of the vehicle and is composed of members made of metal or resin. It may be contemplated to form the shock absorbing device by covering blocks (a plurality of blocks) of a shock absorbing material such as foamed polyurethane with a cover.

However, the plurality of blocks of foamed polyurethane or the like covered with the cover would in many cases collapse or even flow away due to deformation of the cover by the collision. Thus, the initial arrangement of the blocks would not be maintained. As a result, the energy-absorbing function which is expected based on a predetermined block arrangement may not be displayed sufficiently.

Specifically, when the cover surrounding the shock absorbing material is compressed by a collision, the cover is deformed in directions orthogonal to the compression direction. Namely, the box-like cover extends or contracts in directions orthogonal to the compression direction. When the cover extends, the blocks of the shock absorbing material are deformed so as to expand in the extension direction. In extreme cases, the shape or arrangement of the blocks cannot be maintained. On the other hand, when the cover contracts, the shock absorbing material is compressed, and the desired elasticity cannot be maintained. When the shock absorbing material is thus not deformed as expected, it is difficult to estimate the deformation amount corresponding to the impact load predicted to be generated upon collision. Accordingly, there is a demand for a shock absorbing device which is free of the problems relating to the block-shaped shock absorbing material flowing away upon collision or the arrangement of the blocks is disorganized with the result of a reduction in the shock absorbing effect.

SUMMARY AND OBJECTS OF THE INVENTION

It is an object of the present invention to solve the above-mentioned problems and to provide a shock absorbing device capable of producing a sufficient shock absorbing effect by causing an expected deformation of a shock absorbing member under the shock upon collision.

In order to attain the above object, the present invention includes a shock absorbing device comprising a shock absorbing material for absorbing energy by being compressed under an external force due to a collision. A cover is provided for containing the shock absorbing material therein. The cover has a structure such that it is easy to be deformed in the compression direction of the shock absorbing material under an external force and is difficult to be deformed in directions orthogonal to the compression direction.

In addition, the cover is a bellows structure body that is used with its extension/contraction direction coinciding with the direction of the external force.

The bellows structure body comprises four corrugated plates, and clamp metals for connecting the corrugated plates to each other so as to form a tubular shape for holding the shock absorbing material therein.

In addition, the present invention provides the bellows structure body comprising a plurality of frames mutually disposed to be separated in a state of being spaced in the compression direction, and a mesh covering the frames.

Furthermore, the present invention provides the bellows structure body that is attached to a vehicle body with its one end directed in the direction of the external force predicted.

According to the present invention, when the external force is exerted on the shock absorbing device, the cover is easy to be deformed in the compression direction but is not easy to be deformed in the directions orthogonal to the compression direction, so that the shock absorbing material can receive a compressive force corresponding to the external force in the state of being restrained from deformation in the directions orthogonal to the external force. As a result, the shock energy can be absorbed sufficiently.

Furthermore, since the cover is easily deformable in the compression direction under the external force, a set load for the shock absorbing material can be determined by taking into account only the strength of principally the shock absorbing material exclusive of the cover.

According to the present invention, with the bellows structure body easily deformable in one direction, it is possible to provide a cover which can be easily deformed in the compression direction under the external force and can be restrained from deformation in directions orthogonal to the compression direction.

According to the present invention, since the mesh is easily deformable and, simultaneously, is inhibited from deformation by the frames, it is possible to provide a cover which can be easily deformed in the compression direction under the external force and can be restrained from deformation in directions orthogonal to the compression direction.

According to the fifth characteristic feature, the impact energy exerted on the vehicle body upon collision of the vehicle can be sufficiently absorbed by the shock absorbing material.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
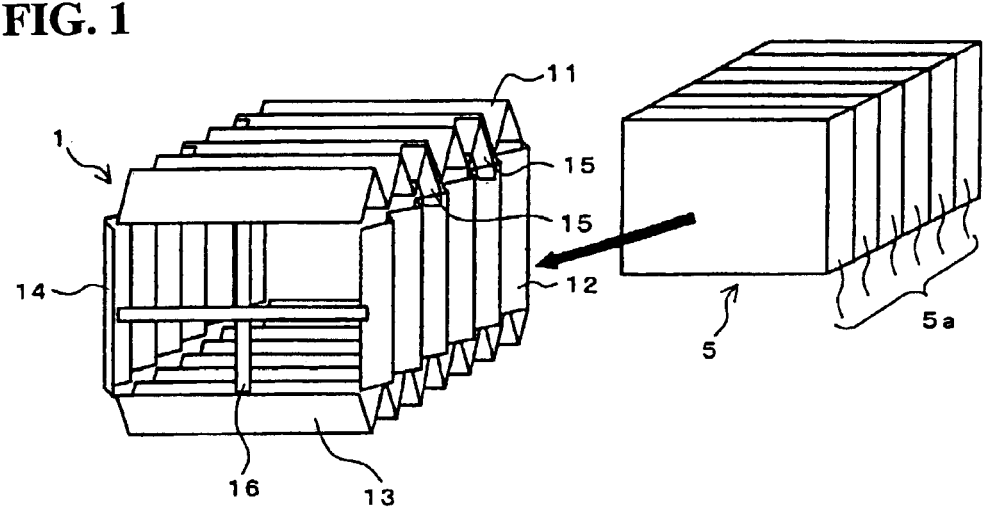
FIG. 1 is a perspective view of a cover included in a shock absorbing device according to one embodiment of the present invention.

The present invention will be described in detail below referring to the drawings. FIG. 1 is a perspective view of a cover included in a shock absorbing device according to one embodiment of the present invention. In FIG. 1, the cover 1 is in a roughly rectangular parallelopiped box shape, and is surrounded by four surfaces, i.e., upper, lower, left and right corrugated plates 11, 12, 13 and 14. Clamp plates 15 for connection of intersecting corner portions of the corrugated plates 11 to 14 and cross bars 16 for coupling end portions of the corrugated plates 11 to 14 are attached to the cover 1. Incidentally, while only the clamp plates 15 are provided at one corner, of the four corners, as shown in FIG. 1, it is preferable to provide at least two clamp plates at each of the four corners.

While the corrugated plates 11 to 14 are desirably corrugated sheets of aluminum or an aluminum alloy, it is possible to appropriately select a sheet of other metal, a molded resin plate or the like. In short, it suffices that the cover 1 as a whole is formed in a bellows shape so that it is easily compressed in one direction. A shock absorbing material 5 constituted of a plurality of plate-like or block-shaped materials 5a is contained in the inside of the cover 1. The material sections 5a of the shock absorbing material 5, may be foamed polyurethane. The bellows shaped cover 1 is attached at its one end to a vehicle body, with its deformation direction coinciding with the direction of collision expected.

Figure 2:
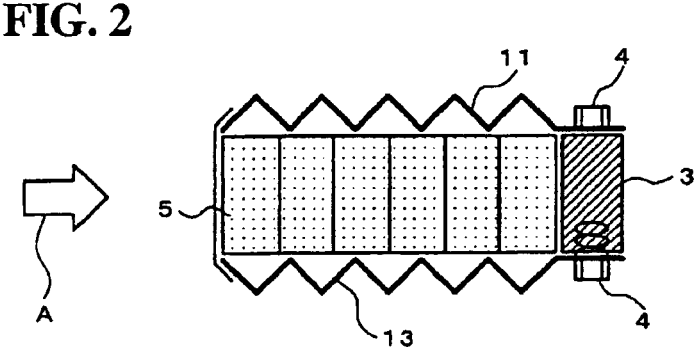
FIG. 2 is a sectional view of the shock absorbing device mounted on a vehicle.

FIG. 2 is a sectional view of the shock absorbing device mounted on a vehicle body. In FIG. 2, the corrugated plates 11 to 14 (only 11 and 13 are shown in the FIG. 2) are fixed to a main body portion 3 of a vehicle, such as a vehicle body frame of a motorcycle, with bolts 4. The means of fixing is not limited to the bolts 4, and the structure of fixing all the corrugated plates 11 to 14 is not limitative; it suffices that at least two of the corrugated plates, for example, the corrugated plates 11 and 13 are connected to the main body portion 3. The shock absorbing material 5 formed in a rectangular parallelopiped shape is contained in the cover 1.

According to the shock absorbing device as above-mentioned, when a shock is exerted in the direction of arrow A, the bellows shaped cover 1 is easily compressively deformed in one direction under the compressive force due to the shock, so that the deformed shape is easy to predict. This is because the cover 1 is deformed only in the direction of contraction of the bellows and it is difficult to be deformed, i.e., extended or contracted in the width directions of the bellows.

Figure 6:
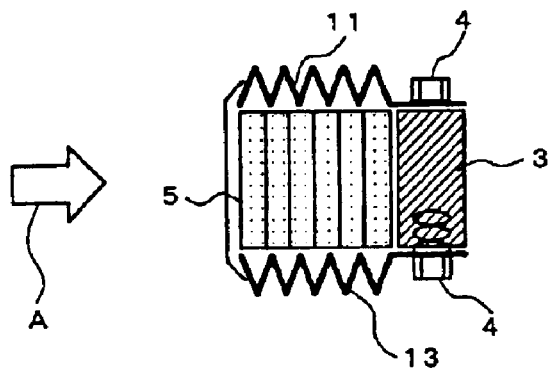
FIG. 6 is a sectional view of the shock absorbing device deformed by collision.

FIG. 6 is a sectional view showing the manner in which the bellows shaped cover of the shock absorbing device is contracted under a shock. As shown in FIG. 6, the bellows shaped cover 1 upon receiving a shock contracts in an intrinsic contraction mode based on the bellows shape, so that the arrangement of the blocks constituting the shock absorbing material 5 is maintained. Therefore, a shock absorbing effect as designed, i.e., as desired can be obtained.

Thus, the shock absorbing material 5 is deformed as expected upon receiving an expected impact load, so that it is easy to predict the absorbed energy due to a collision. Namely, the shape and material of the shock absorbing material 5 that is required can be selected based only on the shock absorbing material 5, substantially neglecting the strength of the cover 1. Therefore, it is possible to design the shock absorbing material 5 in a size which is sufficient for absorbing the energy at the time of collision and which is not excessively large.

Figure 3A:
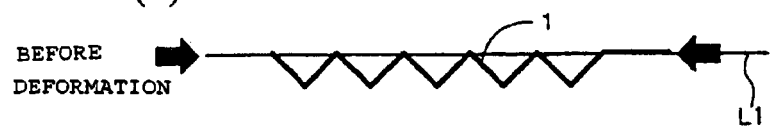
FIGS. 3a and 3b are sectional views of a single corrugated plate, showing a mode of deformation of the cover.
Figure 3B:
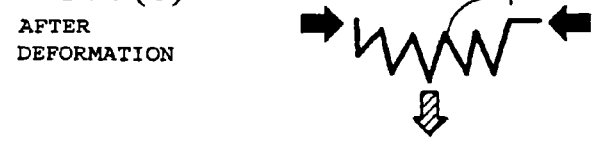

Incidentally, in order that the cover 1 is not deformed in a complicated manner, it is desirable to produce the bellows shaped cover 1 so that its end portions are disposed on a straight line along the extension/contraction direction of the bellows. FIGS. 3a, 3b, 4a and 4b are sectional views of a single corrugated plate, showing the modes of deformation of the cover 1. In FIG. 3a, the end portions of the cover 1 are disposed on a straight line L1 along the contraction direction of the bellows. In this case, as illustrated in FIG. 3b, the cover 1 is uniformly deformed into the shape of a mount or a valley under compression, so that it is easy to predict the shape after deformation.

Figure 4A:
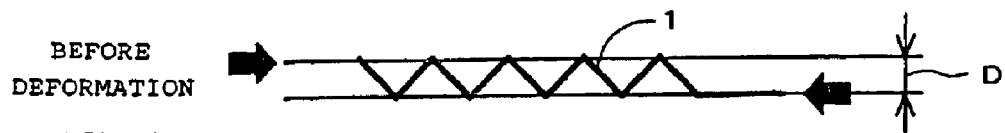
FIGS. 4a and 4b are sectional views of a single corrugated plate, showing a mode of deformation of the cover.
Figure 4B:
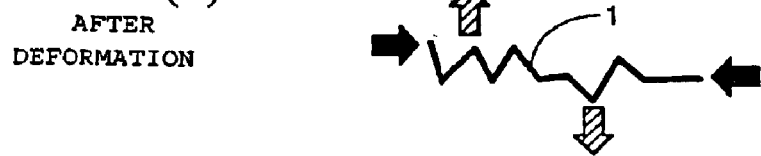

On the other hand, in FIG. 4a, the end portions of the cover 1 are not disposed on a straight line along the contraction direction of the bellows, and a step D is generated between the end portions. In this case, as illustrated in FIG. 4b, the cover 1 is not uniformly deformed under compression but is distorted in a complicated manner, making it difficult to predict the shape after deformation.

Figure 5:
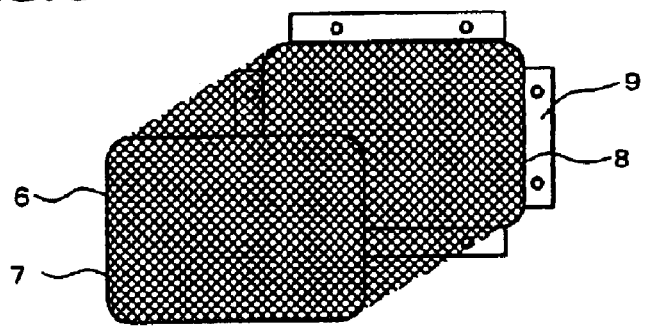
FIG. 5 is a perspective view of a cover of a shock absorbing device according to a modified embodiment.

FIG. 5 is a perspective view of a cover of the shock absorbing device according to a modified embodiment of the present invention. In FIG. 5, the cover 6 for containing a shock absorbing material such as foamed polyurethane which is not shown is a mesh member in the shape of a rectangular parallelopiped as a whole, and is formed, for example, of a metal such as aluminum or an aluminum alloy. Metallic frames, i.e., frames 7 and 8 for maintaining the shape are provided at both ends of the cover 6. The frame 8 is provided with flanges 9, which are connected to a vehicle body frame or the like by bolts or the like, whereby the shock absorbing device is attached to the vehicle body. The number of the frames is not limited to two, and one or more frames may further be provided between the frames 7 and 8.

In the same manner as the cover 1, the mesh form cover 6 is also deformed easily and uniformly under a compressive load due to a collision, so that it is easy to predict the shape after deformation of the shock absorbing material. Therefore, it is easy to design the shock absorbing material which can display the energy absorption required.

Incidentally, while it is preferable to design the shock absorbing device so that the shock is uniquely absorbed by the shock absorbing material, such a design that the shock is absorbed by both the shock absorbing material and the cover may also be adopted. For example, where it is predicted that energy absorption by the shock absorbing material is not sufficient, it is possible to make up for the energy absorbing ability by increasing the thickness of the corrugated plates of the cover 1 or by regulating the mesh of the cover 6.

In addition, the present invention is widely applicable to shock absorption of not only general vehicles such as motorcycles and four-wheel vehicles but also mechanical structures, etc. Also, the position of attachment of the shock absorbing device is not limited to a front portion of a vehicle but may be a rear portion of the vehicle or the like, which can be arbitrarily selected according to the purpose of alleviating the shock at the time of collision.

As is clear from the above description, according to the present invention that the collapse or scattering of the shock absorbing material is prevented by the cover, so that the shock energy can be absorbed securely. In addition, since the cover is easily compressed under the external force due to collision, the shock energy can be absorbed substantially only by the shock absorbing material, so that a set load for the shock absorbing material can be calculated by use of a simple model.

According to the present invention, the shape of the shock absorbing material is maintained by the bellows structure body, and the bellows structure body is easily compressed upon collision, so that the energy absorption by the shock absorbing material is assured.

According to the present invention, the shock absorbing device can be used by mounting it on a vehicle. Thus, it is possible to alleviate the shock upon collision of the vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A shock absorbing device comprising:
   a shock absorbing material for absorbing energy by being compressed under an external force due to a collision; and
   a cover including four corrugated plates for containing said shock absorbing material therein;
   a cross bar for coupling end portions of the corrugated plates of the cover
   wherein said cover has a structure such that said external force required to deform the cover in a compression direction of said shock absorbing material is less than said external force that is required to deform the cover in directions orthogonal to said compression direction, and
   wherein four corrugated plates of the cover uniformly deform into a shape of a mount or a valley under said external force in the compression direction.

2. The shock absorbing device as set forth in claim 1, wherein said cover is a bellows structure body and is used with its expansion/contraction direction coinciding with the direction of said external force.

3. The shock absorbing device as set forth in claim 2, further comprising clamp metals for connecting said corrugated plates to each other so as to form a tubular shape for holding said shock absorbing material therein.

4. The shock absorbing device as set forth in claim 1, wherein cover forms a bellows structure body that is attached to a vehicle body with one end directed in the direction of said external force which is predicted.

5. The shock absorbing device as set forth in claim 2, wherein said bellows structure body is attached to a vehicle body with one end directed in the direction of said external force which is predicted.

6. The shock absorbing device as set forth in claim 3, wherein said bellows structure body is attached to a vehicle body with one end directed in the direction of said external force which is predicted.

7. The shock absorbing device as set forth in claim 1, wherein at least a portion of intersecting corner portions of the corrugated plate separate from each other during deformation of the device in the compression direction.

8. A shock absorbing device comprising:
   a shock absorbing material for absorbing energy by being compressed under an external force due to a collision; and
   a cover including an upper plate, a lower plate, a right plate and a left plate for forming a space wherein said shock absorbing material is disposed within said space; and
   a cross bar for coupling end portions of the right plate and the left plate, and another cross bar for coupling end portions of the upper plate and the lower plate,
   said upper plate, lower plate, right plate and left plate being deformed in a compression direction of said shock absorbing material under said external force that is smaller than said external force that is required to deform said upper plate, lower plate, and left plate in directions orthogonal to said compression direction,
   wherein at least a portion of intersecting corner portions of the upper plate, lower plate, right plate, and left plate separate from each other during deformation of the device in the compression direction.

9. The shock absorbing device as set forth in claim 8, wherin each of said upper plate, lower plate, right plate and left plate is a bellows structure body and is used with its expansion/contraction direction coinciding with the direction of said external force.

10. The shock absorbing device as set forth in claim 9, wherein said bellows structure body comprises a corrugated upper plate, lower plate, right plate and left plate, and clamp metals for connecting the corrugated plates to each other so as to form a tubular shape for holding said shock absorbing material therein.

11. The shock absorbing device as set forth in claim 8, wherein said cover forms a bellows structure body that is attached to a vehicle body with one end directed in the direction of said external force which is predicted.

12. The shock absorbing device as set forth in claim 9, wherein said bellows structure body is attached to a vehicle body with one end directed in the direction of said external force which is predicted.

13. The shock absorbing device as set forth in claim 10, wherein said bellows structure body is attached to a vehicle body with one end directed in the direction of said external force which is predicted.

14. The shock absorbing device as set forth in claim 8, wherein the plates of the cover uniformly deform into zig-zag sections under said external force in the compression direction.

* * * * *